(12) United States Patent
Yen

(10) Patent No.: US 7,578,446 B2
(45) Date of Patent: Aug. 25, 2009

(54) IDENTIFICATION CARD HOLDER WITH FLASH MEMORY CARD READER

(76) Inventor: Shin Yen, 11F/A, No. 88, Sec. 1, Dunhua S. Rd., Taipei (TW)

( * ) Notice: Subject to any disclaimer, the term of this patent is extended or adjusted under 35 U.S.C. 154(b) by 161 days.

(21) Appl. No.: 11/742,700

(22) Filed: May 1, 2007

(65) Prior Publication Data

US 2008/0272191 A1    Nov. 6, 2008

(51) Int. Cl.
    *G06K 7/00* (2006.01)
(52) U.S. Cl. .................................. 235/486; 40/124.06
(58) Field of Classification Search ................. 235/486, 235/380
    See application file for complete search history.

(56) References Cited

U.S. PATENT DOCUMENTS

| | | | | |
|---|---|---|---|---|
| 5,592,408 A * | 1/1997 | Keskin et al. | ................. | 365/52 |
| 6,782,998 B2 * | 8/2004 | Koren | ......................... | 206/39 |
| 6,993,618 B2 * | 1/2006 | Chen et al. | .................. | 710/305 |
| 2005/0077348 A1* | 4/2005 | Hendrick | ..................... | 235/380 |
| 2007/0243769 A1* | 10/2007 | Atsmon et al. | .............. | 439/660 |

* cited by examiner

*Primary Examiner*—Michael G Lee
*Assistant Examiner*—Keith Goodman, Jr.
(74) *Attorney, Agent, or Firm*—Rabin & Berdo, P.C.

(57) ABSTRACT

An identification card holder with flash memory card reader has a body and a card reader module. The body has an identification card holder and a card reader side. The identification card holder holds a personal identification card. The card reader module is formed on the card reader side, is a flash memory card readable and is an audio file playable processing unit.

10 Claims, 8 Drawing Sheets

IDENTIFICATION CARD HOLDER WITH FLASH MEMORY CARD READER

BACKGROUND OF THE INVENTION

1. Field of Invention

The present invention relates to an identification card holder, and more particularly to an identification card holder with flash memory card reader.

2. Description of the Related Art

Flash memory cards are widely used with electronic consumer devices, such as digital cameras, PDAs and the like. A variety of flash memory card formats have been developed including MMC, RS MMC, SD, mini SD, Micro SD card and the like. Furthermore, a card reader is normally used to extract and present a file or data from the flash memory card. However, carrying the card reader all the time is inconvenient.

On the other hand, many organizations require that identification cards be worn at all times so identification card holders are commonly used to hold a personal identification card. Carrying the identification card holder outside the work environment is troublesome, especially since the conventional identification card holder has no other function.

To overcome the shortcomings, the present invention provides an identification card holder with flash memory card reader.

SUMMARY OF THE INVENTION

The primary objective of the present invention is to provide an identification card holder with flash memory card reader to mitigate or obviate the aforementioned problems of the conventional identification card holder.

The identification card holder with flash memory card reader in accordance with the present invention comprises a body and a card reader module. The body has an identification card holder and a card reader side. The identification card holder can hold a personal identification card. The card reader module is formed on the card reader side of the body, is a flash memory card readable processing unit and may be an audio file playable processing unit.

Other objectives, advantages and novel features of the invention will become more apparent from the following detailed description when taken in conjunction with the accompanying drawings.

DETAILED DESCRIPTION OF THE INVENTION

Figure 1:
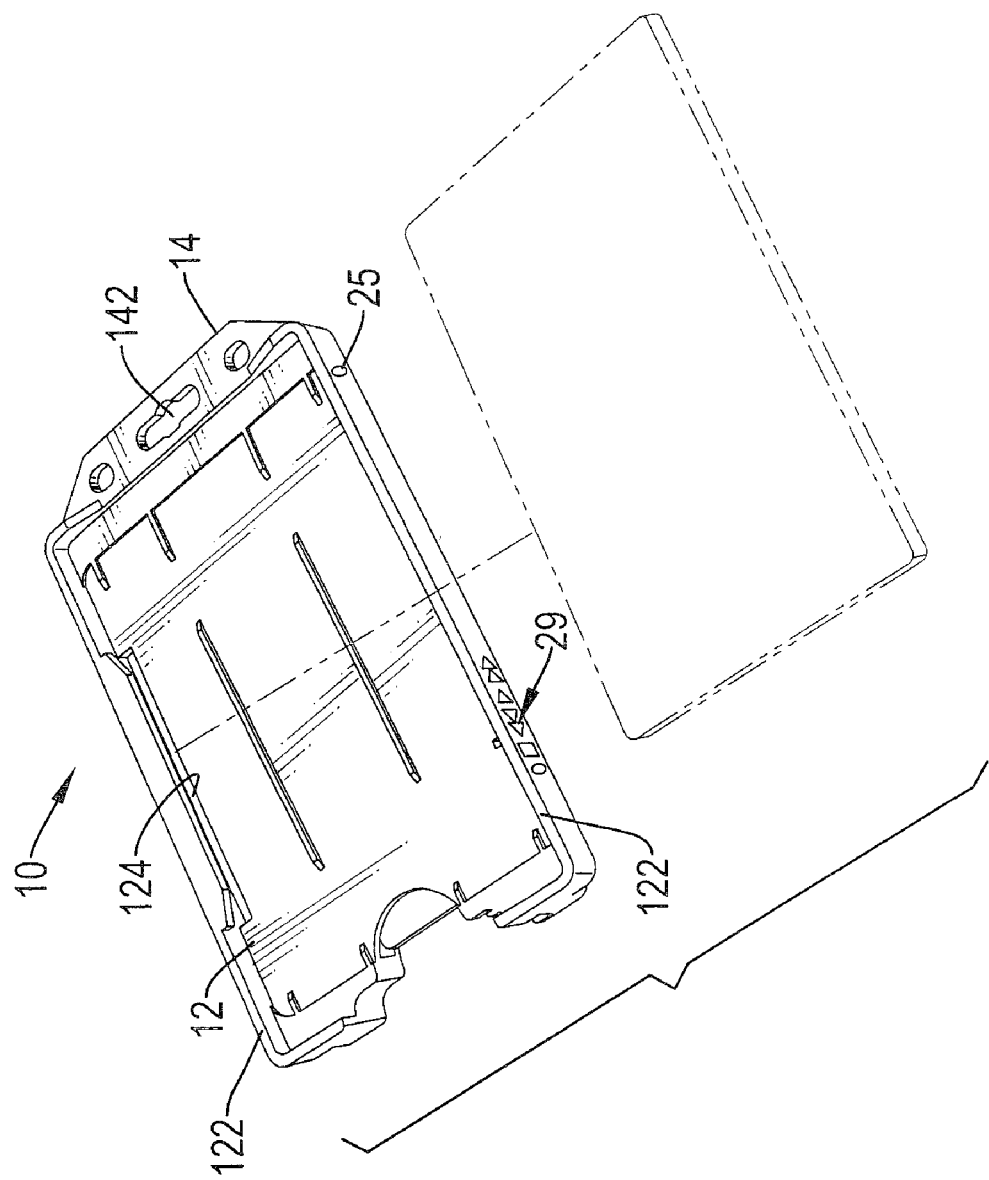
FIG. 1 is an exploded perspective view of an ID card with an identification card holder with a flash memory card reader in accordance of the present invention.
Figure 2:
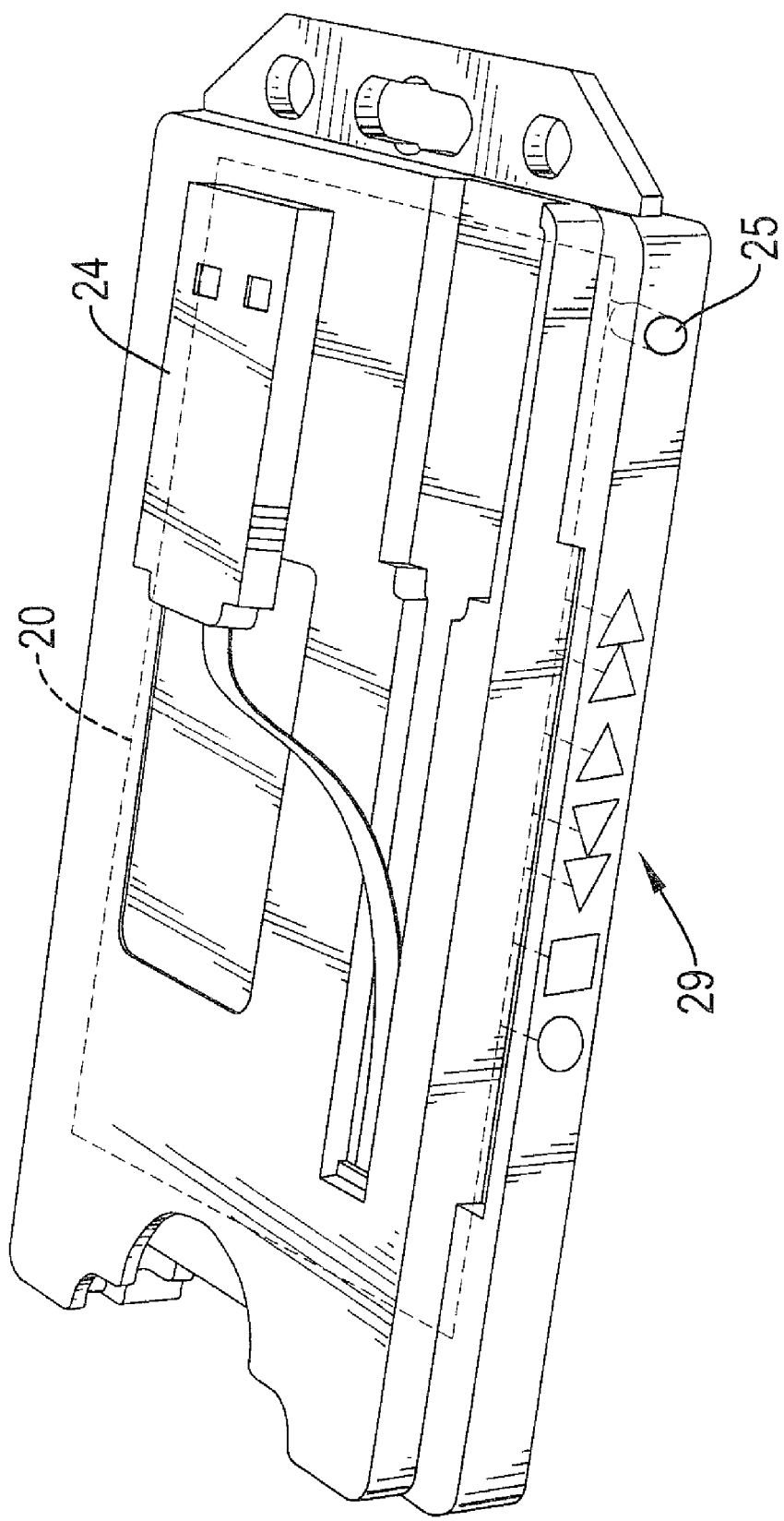
FIG. 2 is a perspective view of the identification card holder in FIG. 1 showing the card reader.

With reference to FIGS. 1, 2, 5, 6 and 7, an identification card holder with a flash memory card reader comprises a body (10) and a card reader module (20).

The body (10) is a panel, may be plastic and rectangular and has a card holding side, a card reader side, an edge, an ID card binder (12) and a connecting tab (14) and may have a clip (16) or a handing slot (18). The ID card binder (12) is formed on the card holding side and may have multiple outer lips (122) and a surface or may be a bounded sheet (121).

The outer lips (122) are formed on and protrude up from the edge of the card holding side opposite to each other, and each outer lip (122) has a top edge and at least one retaining lip (124). The retaining lips (124) hold an ID card in the ID card binder (12) and are formed respectively on and protrude transversely in from the top edges of the outer lips (122). The surface of the ID card binder (12) corresponds to a personal ID card and is bounded by the outer lips (122). The connecting tab (14) is formed on and protrudes out from the edge of the body (10) and has at least one hole (142). The hole (142) may be a slot and is formed through the connecting tab (14) to hold a chain, a clip or the like, such that the user can carry the card holder conveniently and the hands of the user can be kept free.

The bounded sheet (121) is rectangular, is transparent and has two longitudinal edges, a transverse edge, and a non-bound edge. The two longitudinal edges and the transverse edge are bonded on the card holding side of the body (10) so that an ID card could be placed under the bounded sheet (121) through the non-bound edge.

Figure 6:
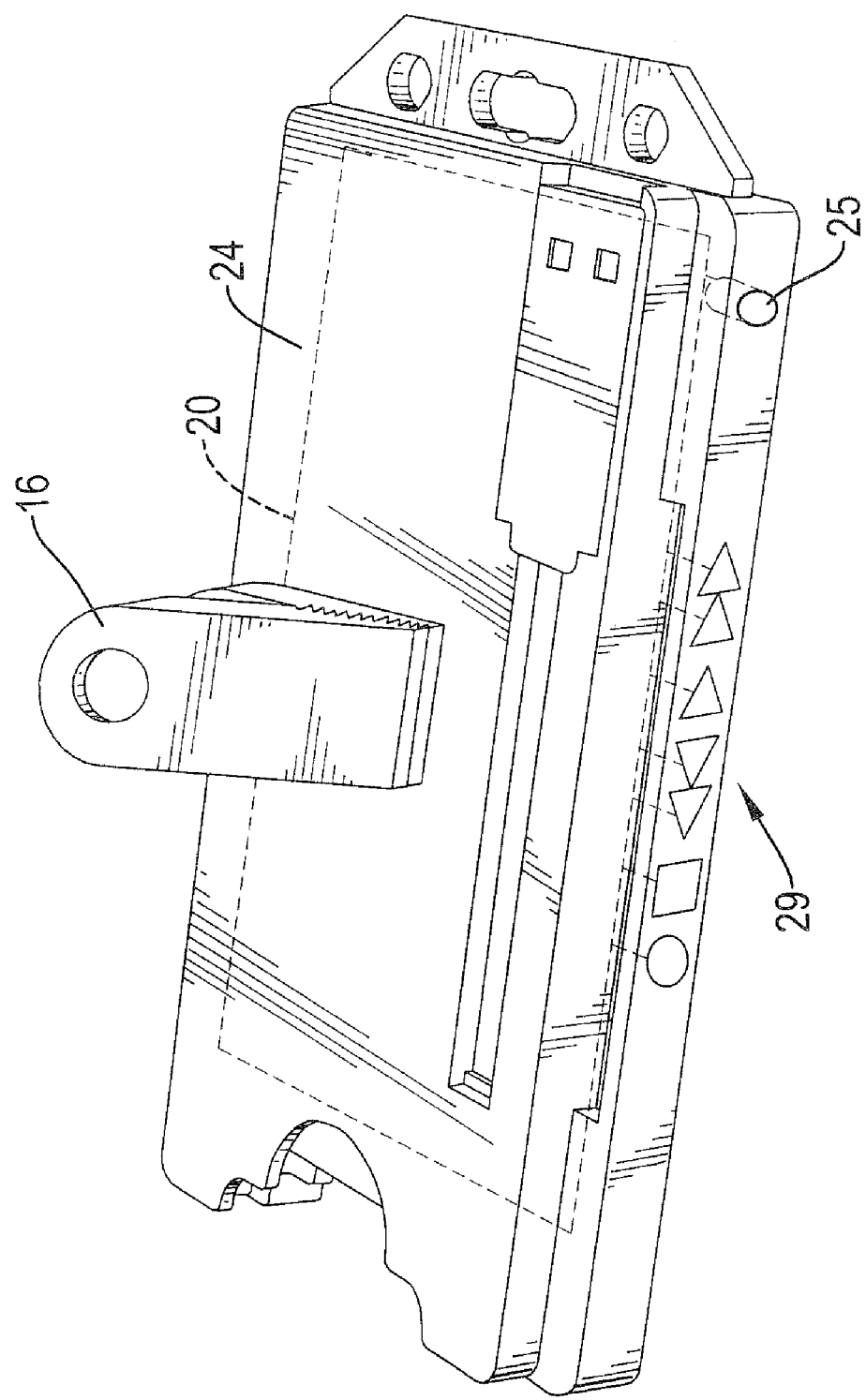
FIG. 6 is a perspective view of a third embodiment of an identification card holder with a clip formed on a card reader side in accordance with the present invention.

With reference to FIG. 6, the clip (16) is formed on the card reader side of the body (10) and is used for clipping the identification card holder with a flash memory card reader on clothes.

Figure 7:
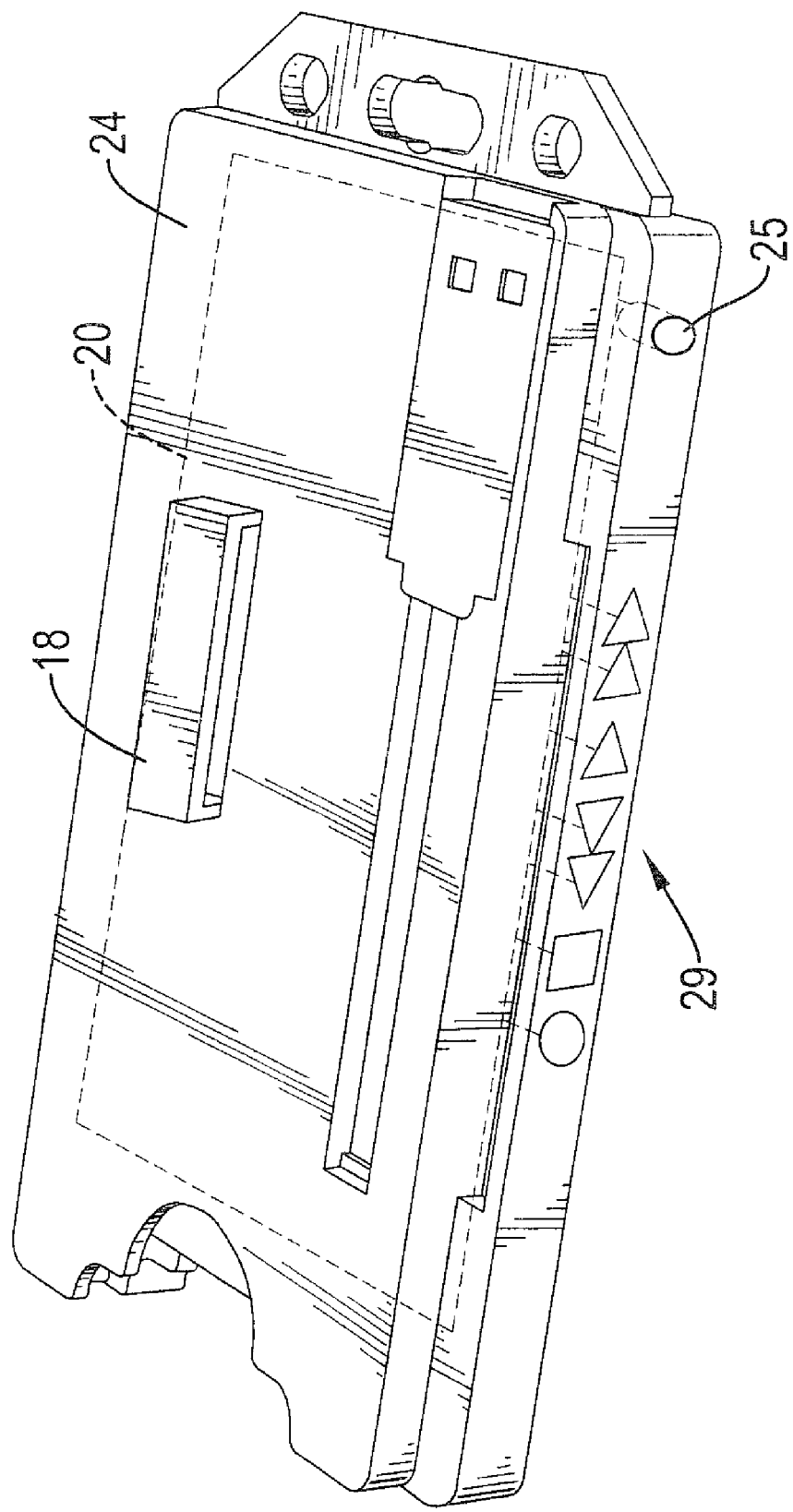
FIG. 7 is a perspective view of a fourth embodiment of an identification card holder with a handing slot formed on the card reader side in accordance with the present invention.

With reference to FIG. 7, the handing slot (18) is formed in the card reader side of the body and is used for accepting a strap for handing or wearing by human.

Figure 3:
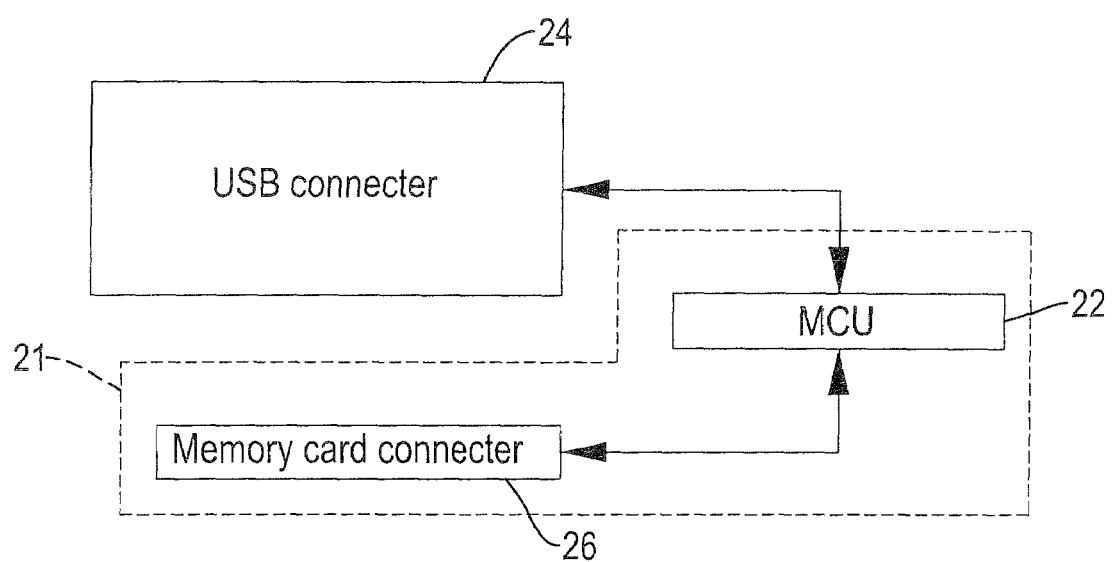
FIG. 3 is a block diagram of a first embodiment of a card reader module in accordance with the present invention in the identification card holder in FIG. 2.
Figure 4:
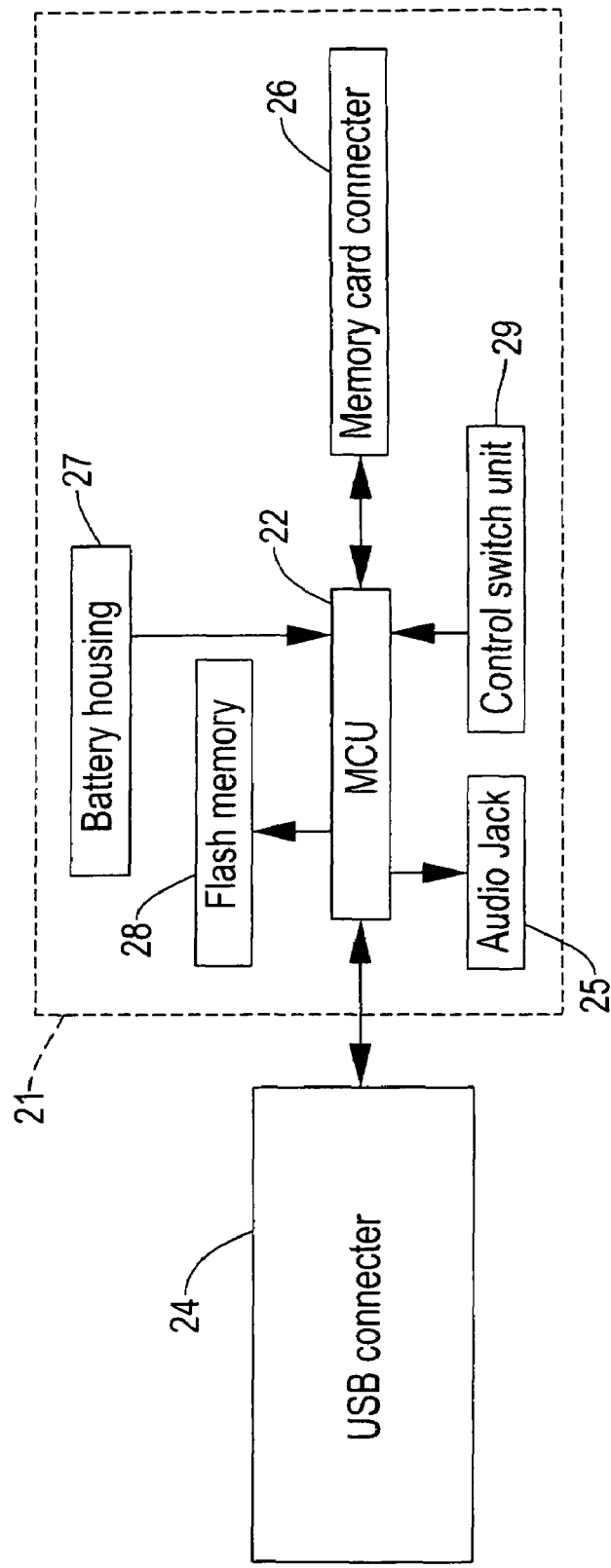
FIG. 4 is a block diagram of a second embodiment of the card reader module in accordance with the present invention in the identification card holder in FIG. 2.
Figure 5:
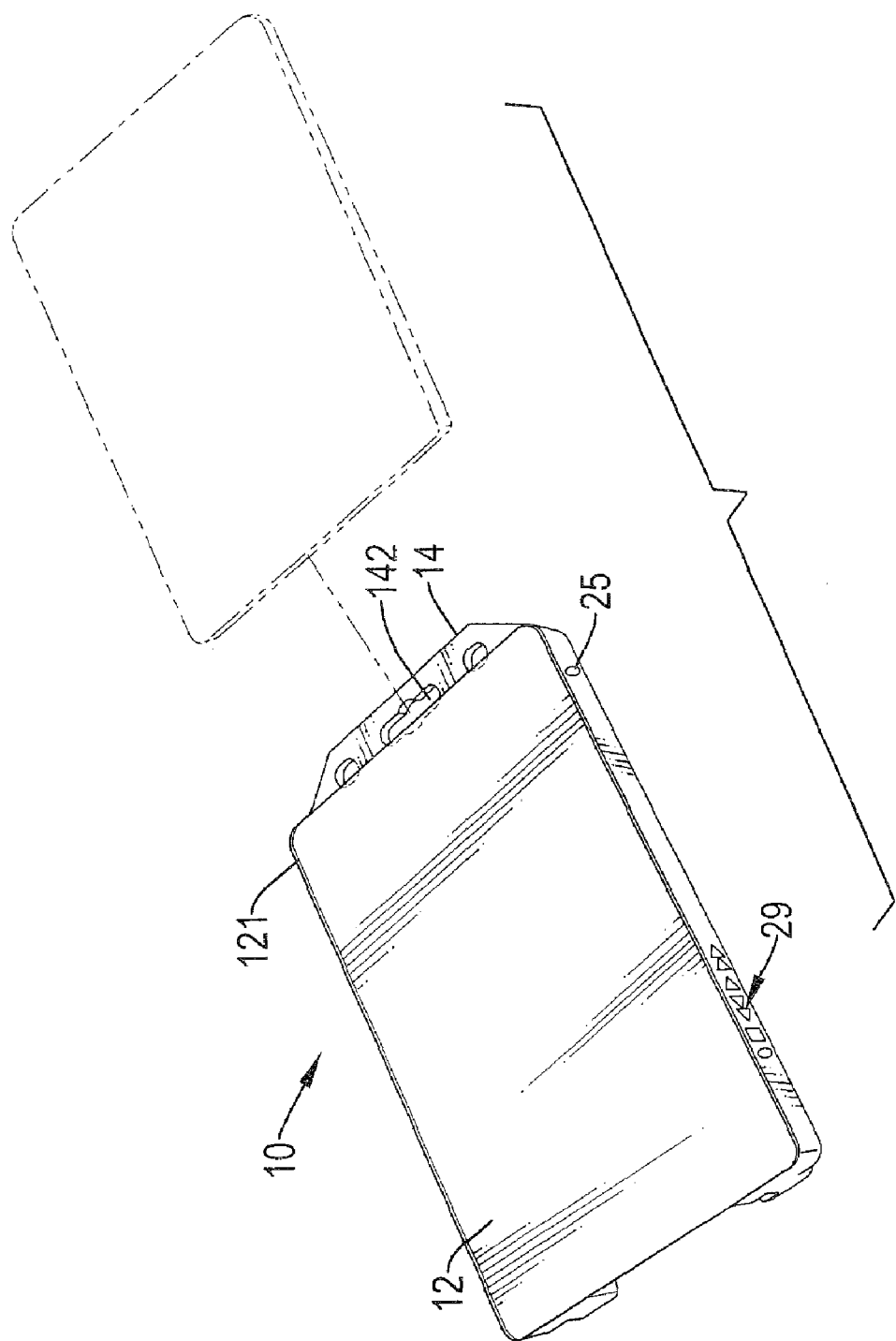
FIG. 5 is an exploded perspective view of the ID card with a second embodiment of an identification card holder in accordance with the present invention.

With further reference to FIGS. 3 and 4, the card reader module (20) may be an audio file playable unit, is formed on the card reader side of the body (10) and has a circuit board (21), a micro control unit (MCU) (22), a USB connector (24), an optional audio jack (25), a memory card connector (26), an optional battery housing (27), an optional flash memory (28) and an optional control switch unit (29). The MCU (22) is mounted on and electrically connected on the circuit board (21) and may be a flash memory card readable processing unit, a multi-functional processing chip or an audio file decodable processing unit. The USB connector (24) is a USB interface and has a proximal end and a distal end. The proximal end of the USB connector (24) is electrically connected to the MCU (22) via the circuit board (21). The distal end of the USB connector (24) connects to a computer USB interface and may be a USB plug or a USB socket. The audio jack (25) is electrically connected to the MCU (22) via the circuit board (21) and has a plug. The plug is an audio output port and an earphone interface. The memory card connector (26) is a flash memory card interface and is electrically connected to the MCU (22) via the circuit board (21). The flash memory card may be a MMC, miniSD, SD, microSD, CF, MS, T-flash card or the like. The battery housing (27) holds a battery, is electrically connected to the MCU (22) via the circuit board (21), supplies power to the MCU (22) when the battery is installed. The flash memory (28) is an internal memory unit of the card reader module (20) and is electrically connected to the MCU (22) via the circuit board (21). The control switch unit (29) is electrically connected to the MCU (22), controls the MCU (22) and may have an on/off switch, a play switch, a stop switch or the like.

Figure 8:
FIG. 8 is an operational perspective view of the identification card holder in FIG. 1.

With further reference to FIG. 8, the identification card holder with flash memory card reader has the advantage of being able to display an ID card and simultaneously read data or play an audio file from a flash memory card, so that another card reader for playing audio file is unnecessary and the use of the card holder is versatile.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. An identification card holder with flash memory card reader comprising
    a body being a panel and having
        a card holding side;
        a card reader side;
        an edge;
        an ID card binder being formed on the card holding side; and
        a connecting tab being formed on and protruding out from the edge of the body and having at least one hole being formed through the connecting tab; and
    a card reader module being formed on the card reader side of the body and having
        a circuit board;
        a micro control unit (M CU) being mounted on and electrically connected on the circuit board;
        a USB connector being a USB interface and having
            a proximal end being electrically connected to the micro control unit via the circuit board; and
            a distal end; and
        a memory card connector being a flash memory card interface and being electrically connected to the MCU via the circuit board.

2. The identification card holder with flash memory card reader as claimed in claim 1, wherein the ID card binder further has
    multiple outer lips being formed on and protruding up from the edge of the card holding side opposite to each other, and each outer lip having
        a top edge; and
        at least one retaining lip being formed on and protruding transversely in from the top edge of the outer lip; and
    a surface being rectangular and being bounded by the outer lips.

3. The identification card holder with flash memory card reader as claimed in claim 1, wherein the ID card binder is a transparent sheet being partially bounded on the card holding side of the body.

4. The identification card holder with flash memory card reader as claimed in claim 1, wherein the body further has a connecting tab being formed on and protruding out from the edge of the body and having at least one hole being formed through the connecting tab.

5. The identification card holder with flash memory card reader as claimed in claim 1, wherein the body further has a clip formed on the card reader side of the body.

6. The identification card holder with flash memory card reader as claimed in claim 1, wherein the body further has a handing slot formed on the card reader side of the body.

7. The identification card holder with flash memory card reader as claimed in claim 1, wherein the body is rectangular and plastic.

8. The identification card holder with flash memory card reader as claimed in claim 2, wherein the MCU is a flash memory card readable processing chip.

9. The identification card holder with flash memory card reader as claimed in claim 8, wherein the connecting tab has a hole that is a slot.

10. The identification card holder with flash memory card reader as claimed in claim 9, wherein the card reader module is an audio file playable unit and further has
    an audio jack being electrically connected to the MCU via the circuit board and having a plug being an audio output port and being an earphone interface;
    a battery housing holding a battery container and being electrically connected to the MCU via the circuit board;
    a flash memory being an internal flash memory unit and being electrically connected to the MCU via the circuit board; and
    a control switch unit being electrically connected to the MCU via the circuit board and controlling the MCU.

* * * * *